(12) United States Patent  (10) Patent No.: US 7,048,600 B1
Broussard                  (45) Date of Patent:     May 23, 2006

(54) METHOD AND APPARATUS FOR AIR COOLED OUTBOARD MOTOR FOR SMALL MARINE CRAFT

(76) Inventor: Kyle Broussard, P.O. Box 401, Loreauville, LA (US) 70552-0401

( * ) Notice: Subject to any disclaimer, the term of this patent is extended or adjusted under 35 U.S.C. 154(b) by 0 days.

(21) Appl. No.: 10/844,192

(22) Filed: May 11, 2004

Related U.S. Application Data

(63) Continuation-in-part of application No. 10/662,487, filed on Sep. 15, 2003, now abandoned.

(60) Provisional application No. 60/411,701, filed on Sep. 17, 2002.

(51) Int. Cl.
 *B63H 20/08* (2006.01)
(52) U.S. Cl. .......................... 440/53; 440/63
(58) Field of Classification Search .................. 440/53, 440/63, 65; 248/640–643
 See application file for complete search history.

(56) References Cited

U.S. PATENT DOCUMENTS

| 941,827 | A | | 11/1909 | Trouche |
| 1,953,599 | A | | 4/1934 | Grimes |
| 2,996,035 | A | * | 8/1961 | Torrey ......................... 440/53 |
| 3,269,351 | A | * | 8/1966 | Shimanckas ................. 440/65 |
| 3,752,111 | A | | 8/1973 | Meynier, Jr. |
| D259,488 | S | | 6/1981 | Carter et al. |
| 4,726,796 | A | | 2/1988 | Rivette et al. |
| 5,336,119 | A | | 8/1994 | Lais et al. |
| 5,435,763 | A | | 7/1995 | Pignata |
| 6,302,750 | B1 | | 10/2001 | Foreman |

OTHER PUBLICATIONS

Mud Buddy Outdoors Web Site, Copyright 2004 Mud Buddy Hyperdrive, Latest News & Info.
Mud Buddy Outdoors Web Site, Copyright 2004 HyperDrive Motors.
Mud Buddy Outdoors, Web Site, Copyright 2004 Q & A's, Electric Tilt & Trim Added May 3, 2004.
Mud Buddy Outdoors Web Site, Copyright 2004 Hyper News Announcement, New Generation of High Perf . . . .

* cited by examiner

*Primary Examiner*—Lars A. Olson
(74) *Attorney, Agent, or Firm*—Robert N. Montgomery (57) ABSTRACT

A belt driven outboard drive and engine assembly mountable to the transom of small flat bottom boats in much the same manner as water-cooled outboard engines. The assembly includes a lower drive shaft assembly that does not extend below the bottom of the boat, but extends a sufficient distance behind the boat to insure the proper angle of attack when the propeller is positioned for contact with mud and vegetation. The engine-mounting bracket includes a unique dual pivot tilt-up and tilt-down capability, an incremental positioner and a pivotal horizontal steering handle. The propeller is capable of cutting through vegetation, provides propulsive thrust in mud and provides relatively fast boat speed in deep water. The assembly further includes a clutch and reverse drive electric motor.

35 Claims, 12 Drawing Sheets

METHOD AND APPARATUS FOR AIR COOLED OUTBOARD MOTOR FOR SMALL MARINE CRAFT

This is a continuation-in-part application claiming priority to non-provisional application Ser. No. 10/662,487 now abandoned filed Sep. 15, 2003 which claims priority to applicant's provisional application No. 60/411,701 filed Sep. 17, 2002.

1. FIELD OF THE INVENTION

This invention relates generally to transom-mounted outboard motors for small marine watercraft and more particularly to air-cooled engines having belt driven propeller shafts for shallow draft watercraft.

2. GENERAL BACKGROUND

Small marine craft operating primarily in shallow water are often referred to as mud boats. Such boats are usually shallow draft flat bottom boats powered by in-board air cooled engines with outboard drives adapted to pass through the hull or transom for coupling to the engine, as disclosed by U.S. Pat. Nos. 941,827, 3,752,111 and 4,726,796.

In some cases small air cooled engines have been adapted for fixed attachment to a boat's transom for pivotal steering in the horizontal plane, with an extended drive shaft extending rearwardly to just below the water line at an angle of approximately 30 degrees as illustrated by Foreman in U.S. Pat. No. 6,302,750.

Other patents, such as Cater et al. in U.S. Des. 259,488 illustrate the use of an air cooled engine pivotally mountable to the boat's transom with the same elongated drive shaft extending to just below the waterline perhaps at a somewhat greater angle, depending on the height of the transom. In most cases the drives are designed not to extend below the bottom of the hull.

Lais et al. and others disclose the use of electric motors in combination with a belt drive to maneuver small craft as is disclosed in U.S. Pat. Nos. 5,336,119 and 1,953,599. Obviously, such drives are not intended for high speed or for extended-powering through mud or vegetation in shallow water.

The use of air cooled or water cooled marine engines coupled by belt to a transom mounted drive unit are well known within the art as being a most efficient means for driving a propeller shaft thereby reducing friction and improving mechanical advantage over right angle gear drives. Therefore, the use of a belt drive in combination with an air cooled engines as disclosed by Pignata in U.S. Pat. No. 5,435,763 seems to be an obvious choice. However, Pignata utilizes a unique internal propeller arrangement and with a through the transom coupling for an inboard air-cooled engine with pivotal kick-up capability or over the top of the transom arrangement. However, Pignata fails to fully disclose how either such arrangement may be steered effectively. While the Pignata apparatus may be useful in open water it is far from obvious that it could be adapted for use in shallow water marsh with heavy mud and vegetation. The internal propeller housing must be located below the boat hull for water to be drawn effectively through the internal propeller blades. Therefore, if the propeller housing were above the bottom of the boat's hull water flow would be blocked. Shallow draft boats are known to create a depression at speed for some distance directly behind the transom it is therefore essential that the propeller shaft extend below the boat hull or beyond the water depression to make sufficient contact with the water to provide thrust and prevent cavitations.

Mud boats rely a great deal on propeller contact with the mud and the propeller's ability to cut the vegetation to help drive the boat. Hence the concept of having an elongated drive shaft extending at a shallow angle from above a boat's transom to just below the water surface has long been the excepted practice for mud boats. However, the use of a fixed inboard engine with a through transom coupling limits the apparatus to a particular boat and therefore may not be removed and mounted on another boat without extensive modifications. The use of a removable over the transom mounted air-cooled engine with extended drive shaft is awkward and often limited to a relatively low horsepower engines. There is obviously a need to provide a relatively high horsepower air cooled engines adapted to an efficient belt drive for mounting to small, flat bottom boats in much the same manner as water cooled outboard engines. Such a driver must also be equipped with a foot that does not extend below the bottom of the boat but extends a sufficient distance behind the boat to insure the proper angle of attack when the propeller is in contact with mud and vegetation.

The use of a wide variety of commercially available air-cooled engines with 50 horsepower or more presents a wide range of problems that must be addressed that are not encountered by conventionally manufactured outboard engine manufactures. By not manufacturing the engine, the drive must be adaptable to multiple engine configurations and drive train configurations. The weight of the engines must be considered and balanced in regard to the drive. Unique pivotal adjustments are necessary to insure safety and proper angles of attack at various speeds. The use of transmissions and clutches must also be considered in an attempt to reduce weight and cost. Conventional drives are inadequate due the constant inter-reaction with debris and mud including stumps and rocks. Therefore, consideration must be given to special propellers and their couplings when used as solids conveying means. Contact with underwater object is a serious safety problem with mud boat drives since the engine can kick up or sideways causing serious harm to the operator.

It should be understood that a distinction should be made between air cooled engines utilizing a fully enclosed, self contained, circulating water system and water cooled marine engines that utilize the water in which they are submersed within for cooling. Some air-cooled marine outboard engines have also been developed. However, for the purpose of this application air cooled engines used as an outboard drive are considered to be both air and self-contained water-cooled engines generally used for inboard drive engines or utility applications other than marine.

3. SUMMARY OF THE INVENTION

A relatively high horsepower air-cooled engine adapted to an efficient belt drive assembly capable of being transom mounted to small flat bottom boats in much the same manner as conventional outboard engines. The drive is equipped with a lower drive shaft that does not extend below the bottom of the boat but extends a sufficient distance behind the boat to insure contact with the water for conventional propulsion. A unique pivotal arrangement allows the engine and drive assembly to be positioned for proper angle of attack when the propeller is in contact with mud and vegetation below the bottom of the boat. This arrangement allows for a much shorter turning radius than can be achieved by the related prior art transom mounted mud motor systems. The engine mount includes incremental tilt positioning capability and a pivotal horizontal steering handle. The propeller is capable of providing propulsion when in contact with solids such as mud and vegetation, and provides relatively fast hull speed in deep water. A clutch is provided to disengage the engine from the drive and an electric drive motor is provided in contact with the belt drive for turning the drive in a reverse direction.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

5. DETAILED DESCRIPTION OF THE PREFERRED EMBODIMENT

Figure 1:
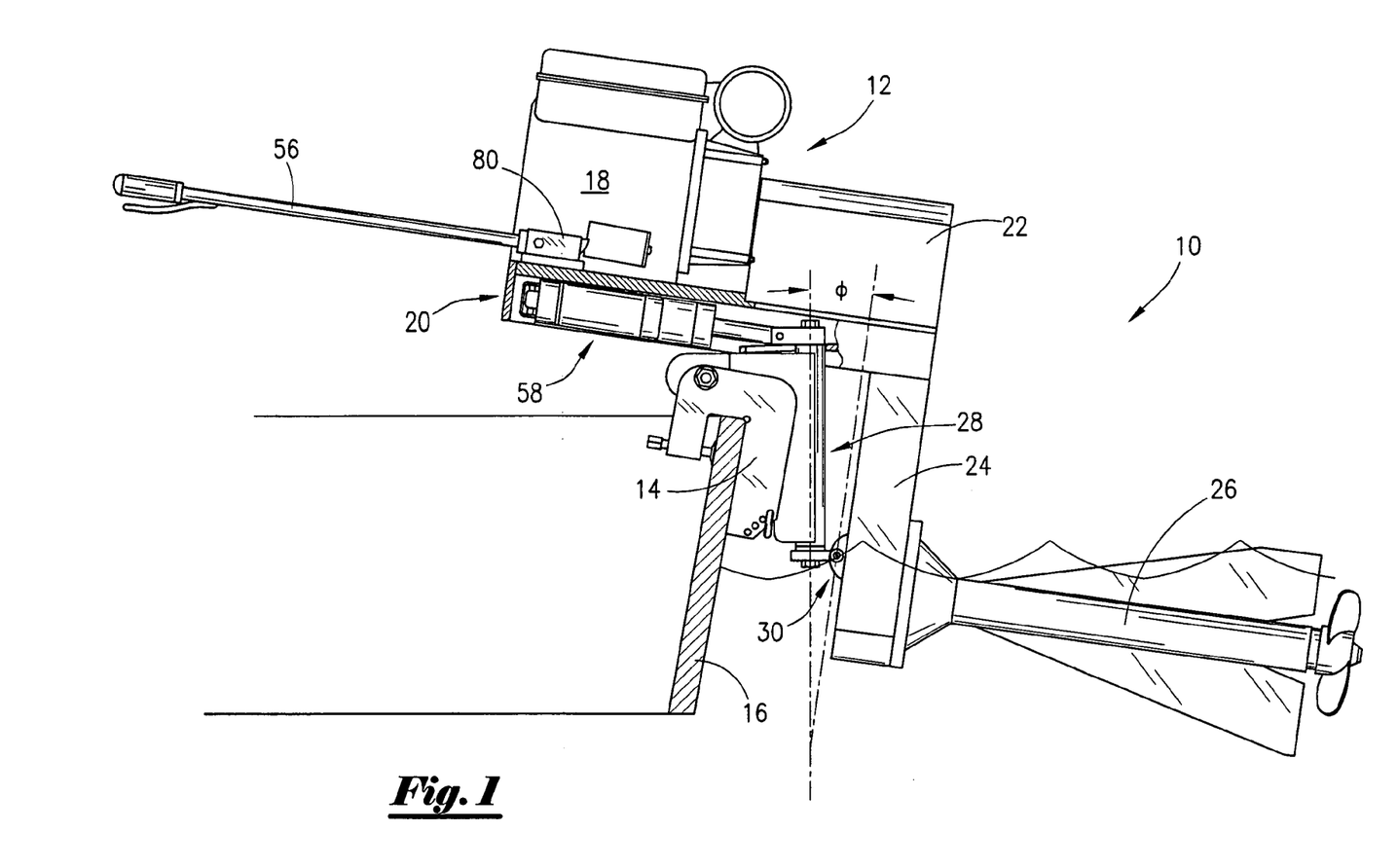
FIG. 1 is a side elevation view of the preferred embodiment in the conventional drive position.
Figure 2:
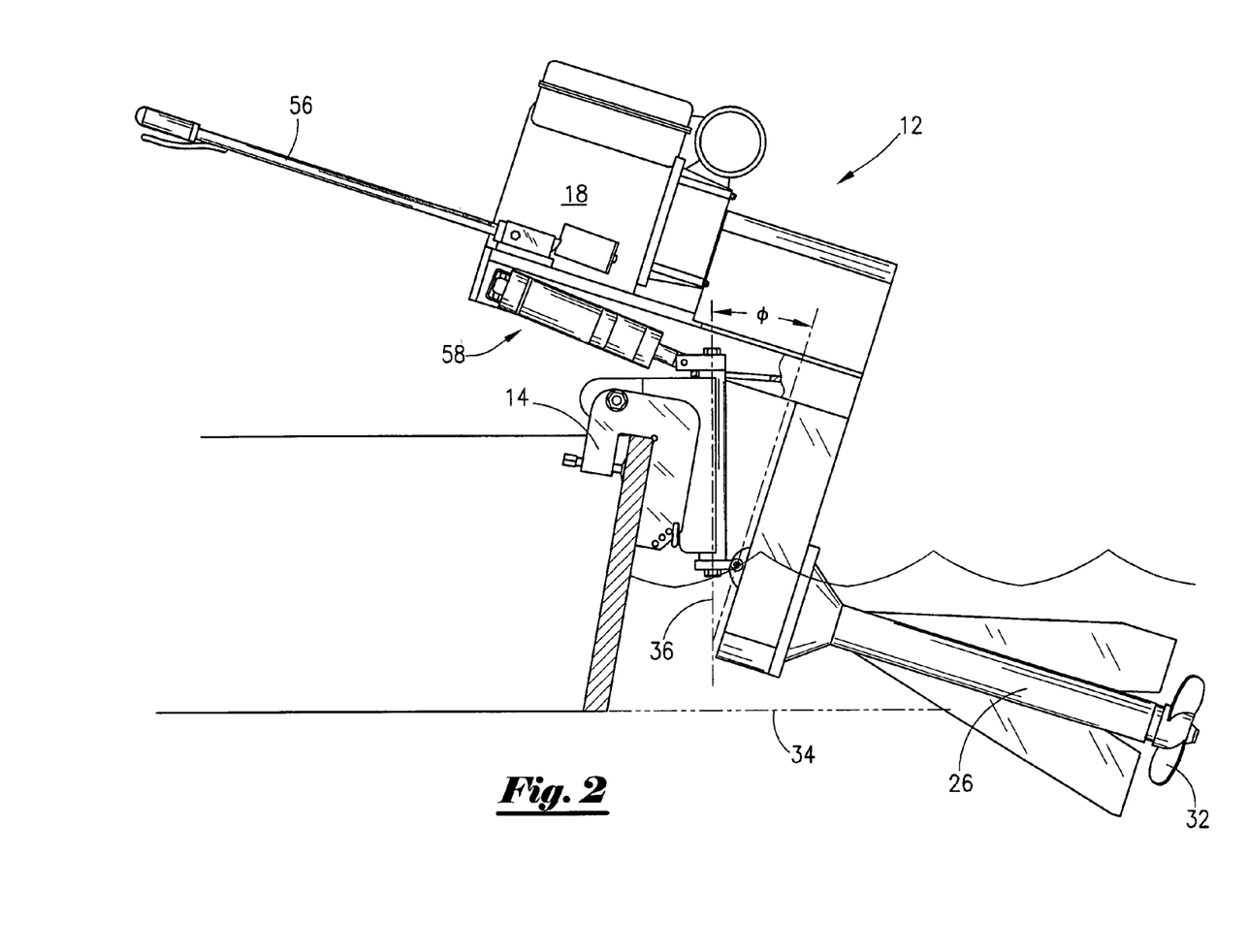
FIG. 2 is a side elevation view of the preferred embodiment in the mud engagement position.
Figure 3:
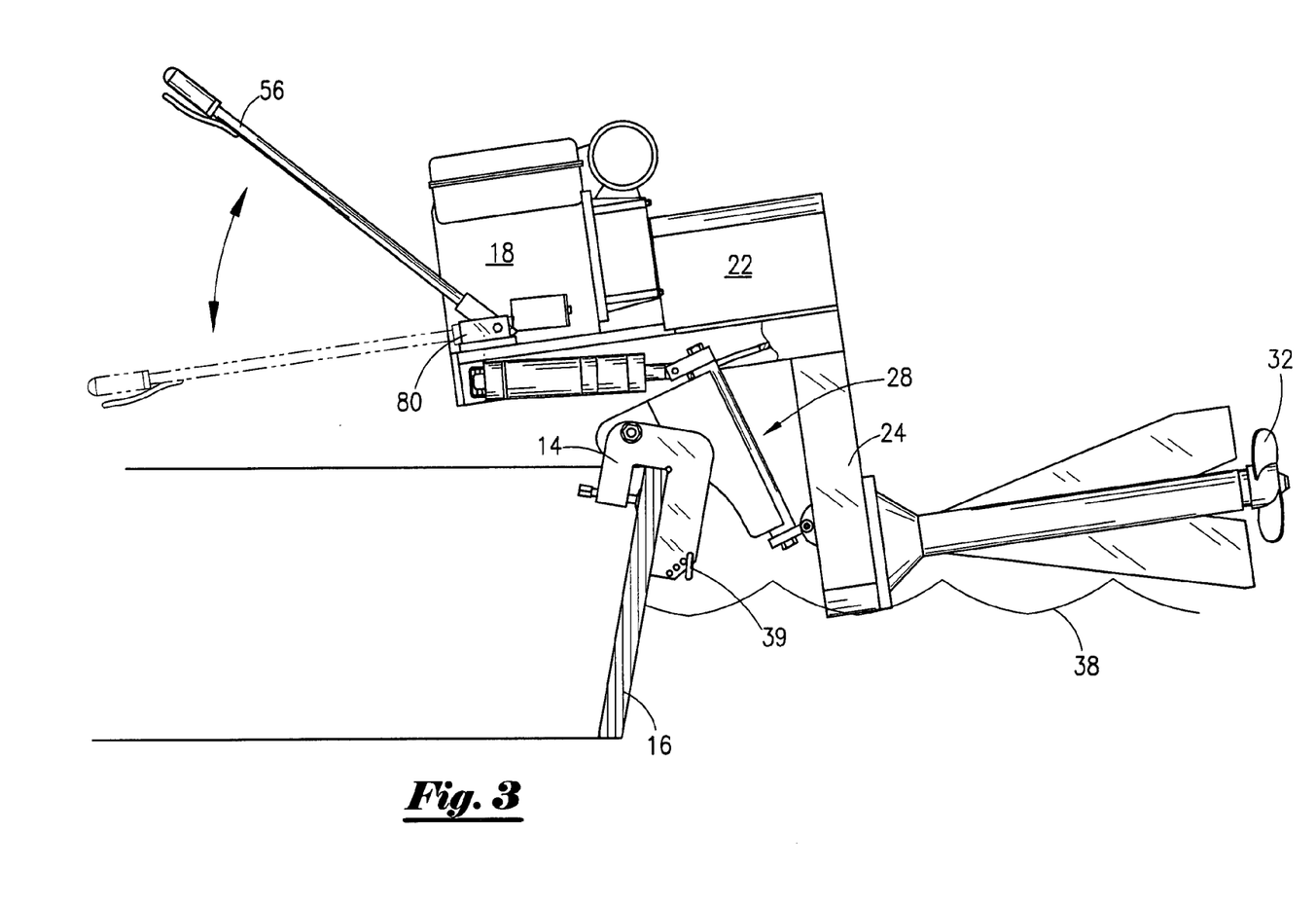
FIG. 3 is a side elevation view of the preferred embodiment in the tilt up position.

The preferred embodiment 10 of the outboard drive assembly 12 as shown in FIG. 1 utilizes a conventional mounting bracket 14 for attaching the outboard drive assembly 12 to a boat's transom 16. The drive assembly 12 consisting principally of any number of commercially available air-cooled or self-contained water cooled utility engine assemblies 18 adaptively mounted to the frame assembly 20. The engines are connected by way of clutch and or transmission assemblies located within the transmission housing 22, to a belt and gear drive assembly located within the vertical housing 24, to which is connected the output drive shaft assembly located within the shaft housing 26 as previously discussed in our prior application. In this case, the frame assembly 20 and vertical housing 24 are adaptively mounted in a pivotal and rotatative manner to the pintle assembly 28. This allows the entire drive assembly 12 to be pivotal about the pin assembly 30 located at the base of the pintle assembly 28 further disclosed in FIG. 10. This pivoting motion also allows the angle "φ" of the drive assembly 12 to be increased relative to the pintle assembly 28 as shown in FIGS. 1, 2, thus placing the propeller 32 below hull level 34, while still allowing the drive assembly 12 to be rotated about the central axis 36 of the pintle assemble 28. In addition the pintle assembly 28 can still be pivoted upwards positioning the propeller clear of the water 38 or at selected positions established by the pull pin 39 relative to the transom 16 as shown in FIG. 3.

Figures 4, 5:
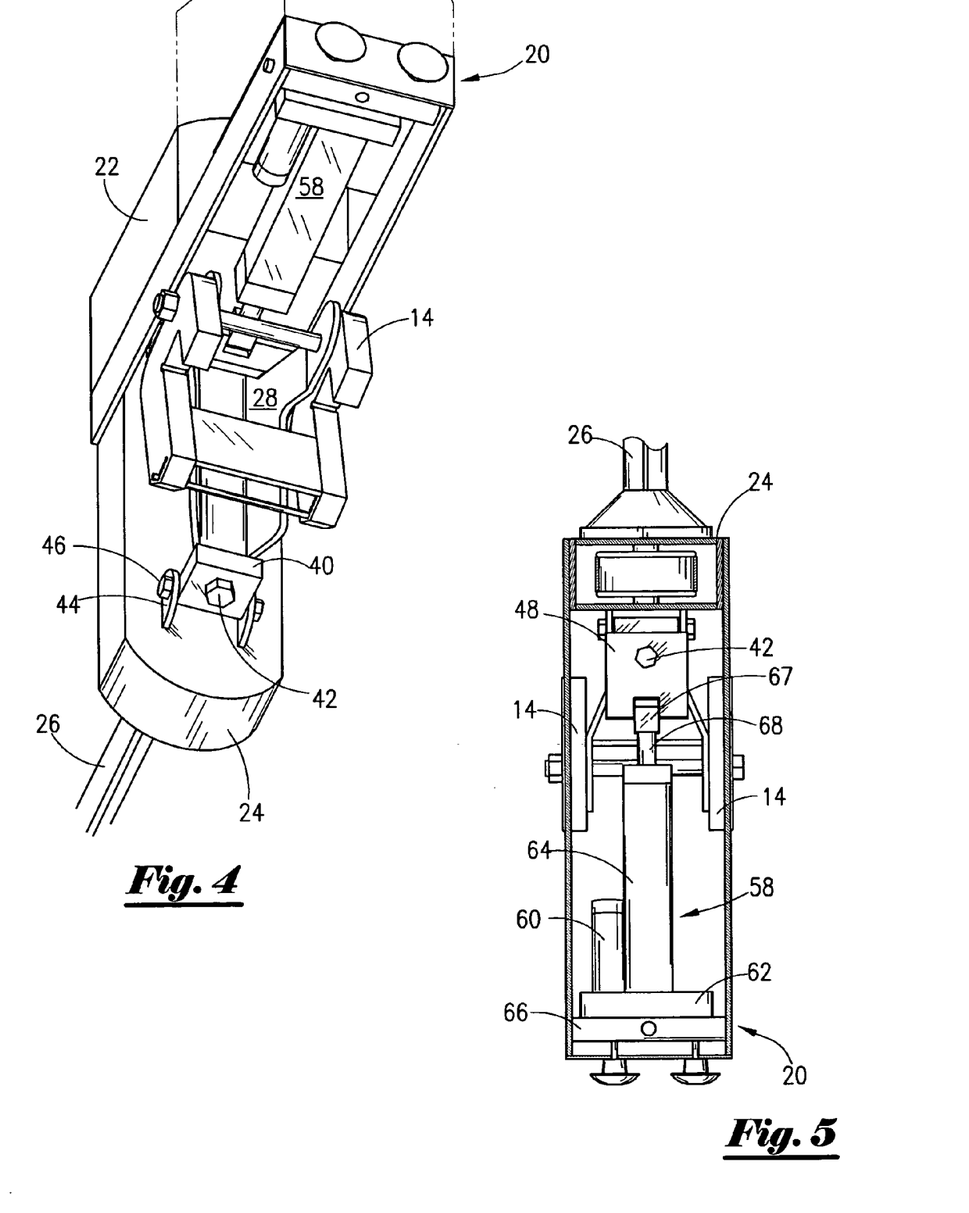
FIG. 4 is an isometric view of the underside of the preferred embodiment with rotary actuator.
FIG. 5 is a partial cross section view of the underside of the preferred embodiment shown in FIG. 4.
Figure 10:
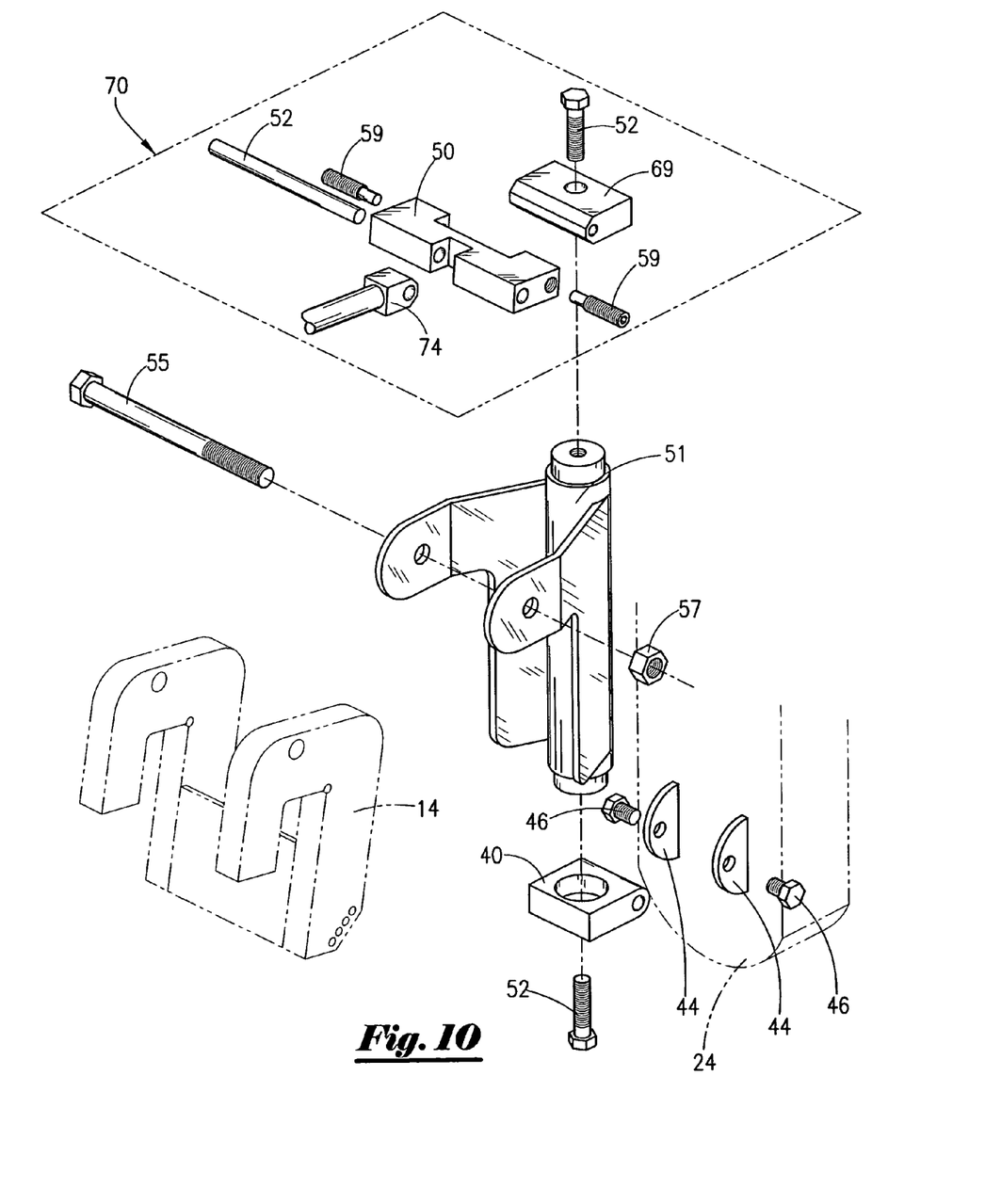
FIG. 10 is an exploded view of the pivotal assembly with actuator connection.

As seen in FIG. 4, and in greater detail in FIG. 10, the lower pintle pin assembly 30 utilizes a pivot block 40 secured to the pintle assembly 28, in a rotative manner about the rod 42 and is pivotally attached to the vertical housing 24 by a pair of clevis pad eyes 44 and a pivoting pin 46 passing through the pad eyes 44 and the block 40.

Figure 10A:
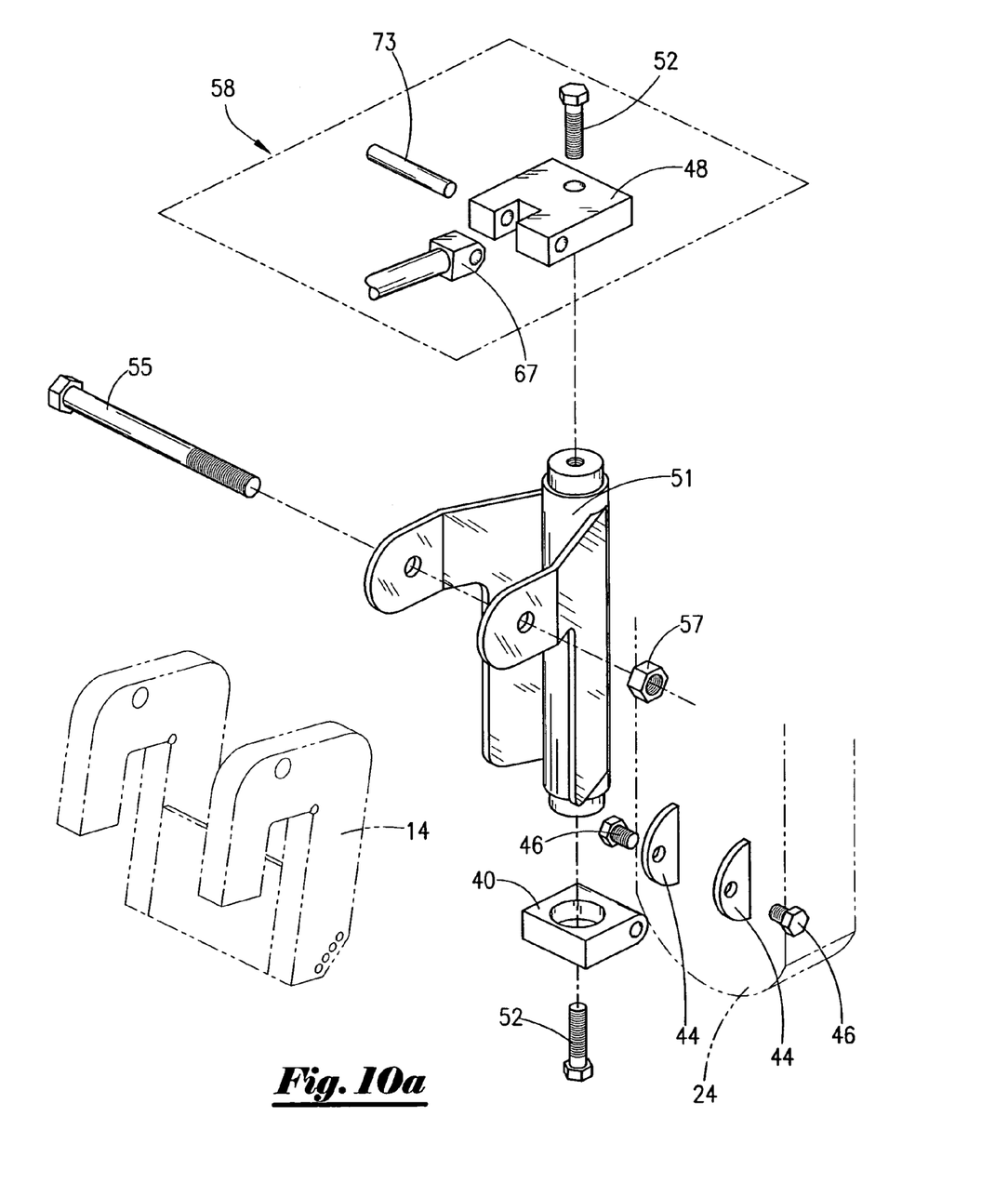
FIG. 10a is an exploded view of the pivotal assembly with manual positioning connection.

As shown in FIG. 5 and in more detail in FIG. 10a an upper pintle block 48 is secured to the pintle assembly 28 in a rotative manner about and by the rod 42. The upper block 48 further includes the spreader plate 50 secured within the frame 20 by a pin 52 extending through slots 54 on each side of the frame 20 thus allowing the frame 20 to be pivotal relative to the pintle assembly 28.

As shown in FIG. 10 the pintle assembly 28 further includes the pintle sleeve assembly 51 that is pivotally connected to the transom bracket 14 and rotational about pintle pivot pin 55 secured by a fastener such as a nut 57. Further, the spreader plate 50 is pivotally secured to the pintle block 69 by a set of studs 59 when used with the manual positioner assembly 70 shown in FIGS. 8 and 9. However, an upper pintle block 48 is used in combination with rod clevis 67 pin 73 as seen in FIG. 10a when used with the linear actuator assembly 58 seen in FIG. 5.

Generally, over the transom mud boat drive units are positioned by utilizing the extended handle 56 seen in FIGS. 1, 2 and 3. However, for safety and convenience the ability to pivot the handle as shown in FIG. 3 is a distinct advantage. However, to achieve this an alternative method must be provided for pivotally positioning the drive assembly 12 in the vertical plane while using the handle for positioning in the horizontal plane. Two possible methods are illustrated herein.

The first being a linear actuator assembly 58 seen in FIGS. 1, 2, 3, 4, and 5. The actuator assembly 58 is essentially comprised of an electric motor 60 a gear reducer 62 and a linear positioner 64 as shown in FIG. 5 and better seen in detail in FIG. 10. In this arrangement, the base 66 of the actuator assembly 58 is fixed to the frame 20 while the rod 68 and its rod eye 67 member of the linear positioner 64 is pivotally attached to the pin 52.

As illustrated in FIG. 1 the linear actuator assembly 58 when extended positions the drive shaft housing 26 in a neutral plane whereby the shaft housing is virtually perpendicular to the transom 16. Retraction of the positioner 64 pivots the shaft housing in a negative direction thus forcing the drive shaft 26 and propeller 32 below the bottom hull level 34 as shown in FIG. 2.

Figure 6:
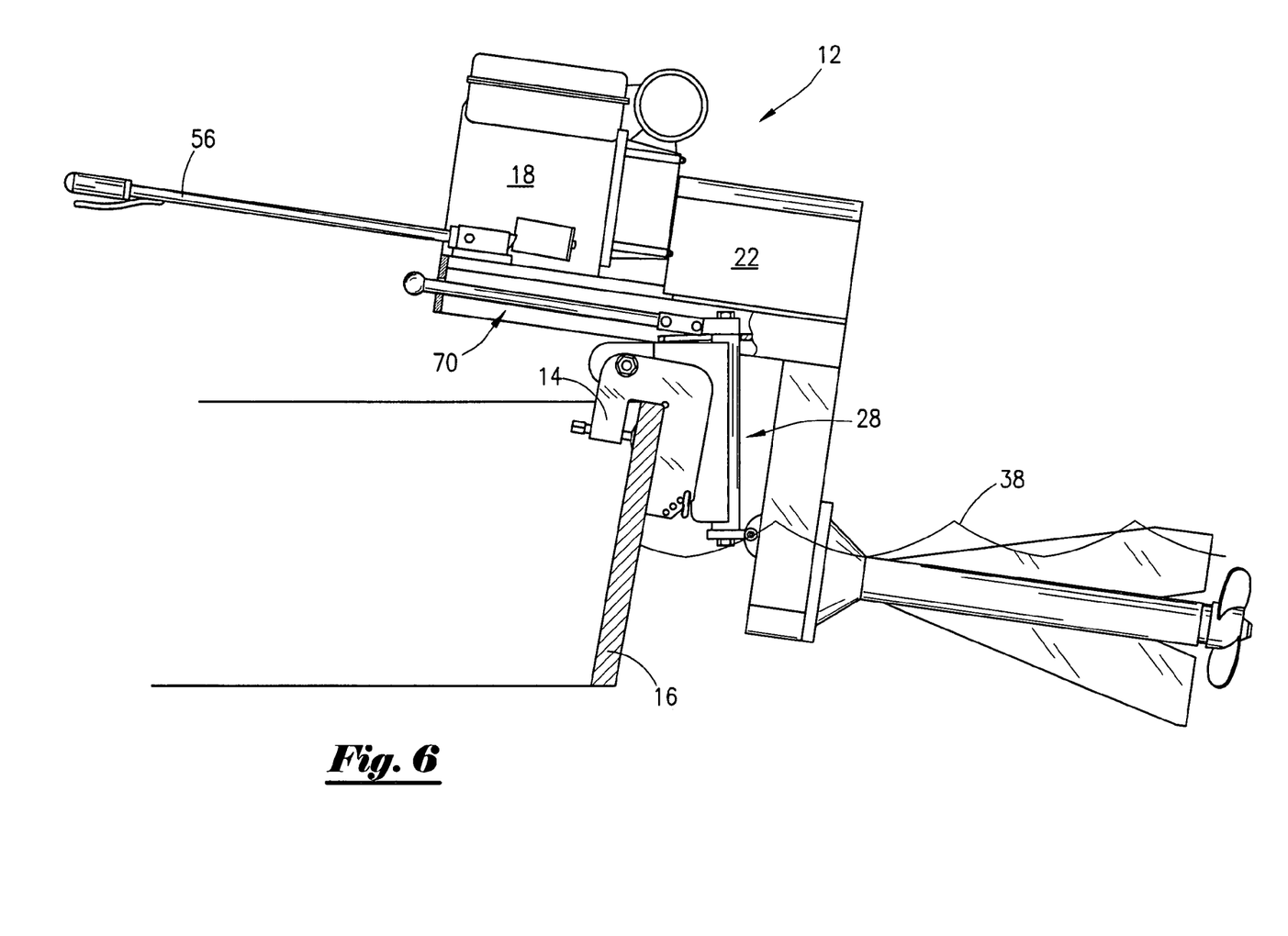
FIG. 6 is a side elevation view of the embodiment with manual positioner in the conventional drive position.
Figure 7:
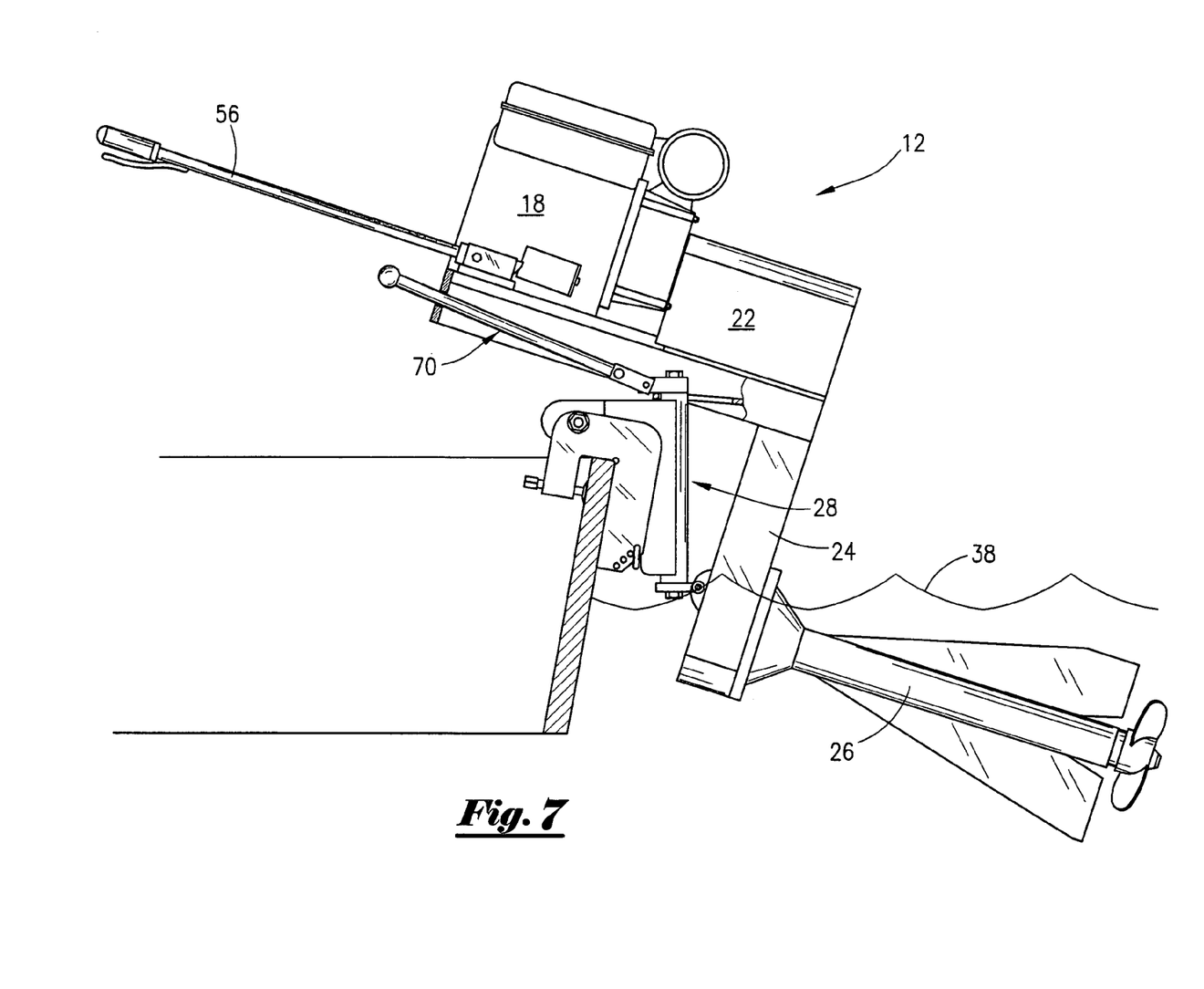
FIG. 7 is a side elevation view of the embodiment with manual positioner in the mud engagement position.
Figure 8:
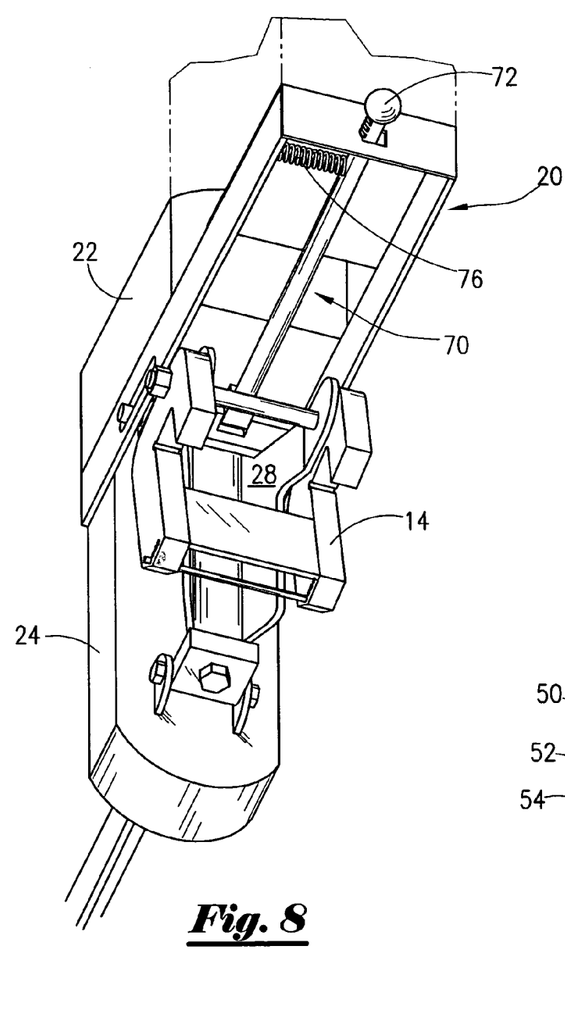
FIG. 8 is an isometric view of the underside of the embodiment with manual positioner.
Figure 9:
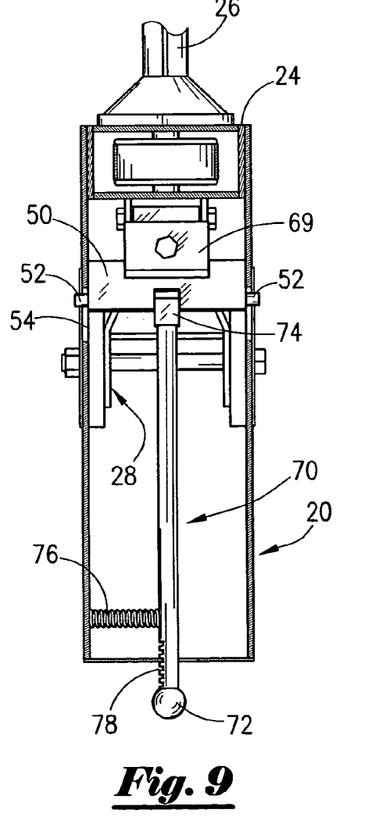
FIG. 9 is a partial cross section view of the underside of the embodiment shown in FIG. 8.

The second positioner being a manual operated locking assembly 70 as shown in FIG. 6, FIG. 7, and FIG. 8 and in detail in FIG. 9. Looking first at FIG. 9 we see that the manually operated locking assembly 70 is simply a lever or handle passing through the frame assembly 20, with a ball 72 at one end and rotatably mounted at the opposite end 74 to the spreader bar pin 52 passing though the frame 20 and spreader plate 50 in a relatively loose manner. A spring 76 provides tension on the handle assembly 70 to insure indentation locking between the series of notches 78 adjacent the ball 72 and an edge of the frame 20.

Looking back at FIG. 6 we see that by laterally moving the handle assembly 70 away from the spring 76 releases the frame 20 by moving the notches 78 in the handle away from the frame 20. Therefore, by manually lifting the throttle handle 56 while holding the positioning handle 70 the drive assembly 12 can be easily tilted to a new position as shown in FIG. 7.

Figure 11:
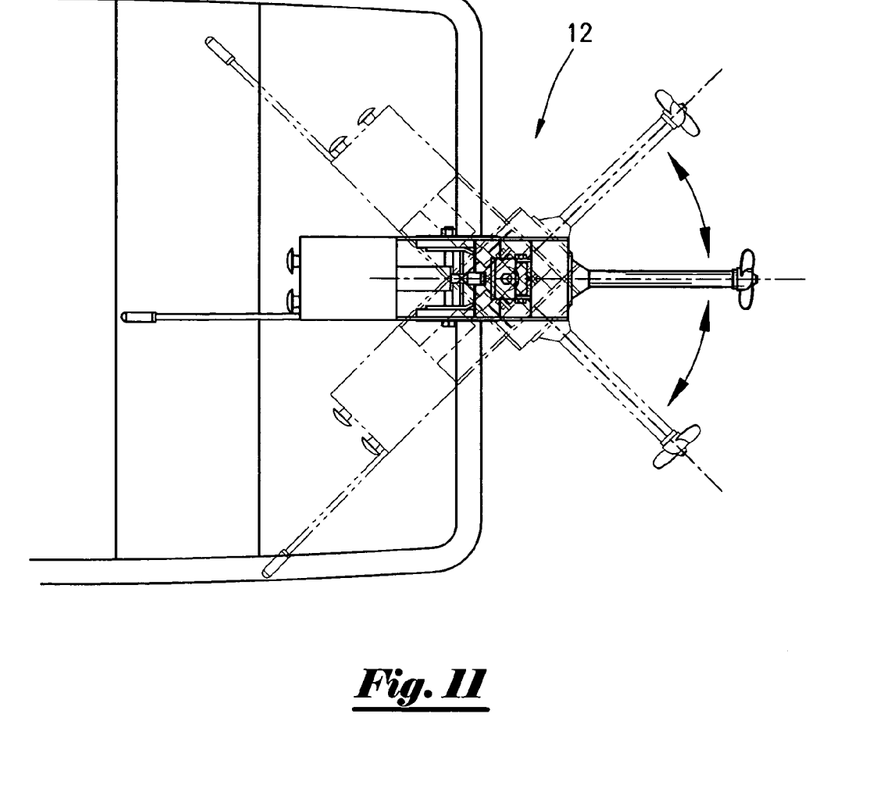
FIG. 11 is a top view of the drive assembly showing rotation in horizontal plane.

As shown in FIG. 11 the overall length of the drive assembly 12 is considerably shorter than that of other drives used for this purpose and has a much smaller turning radius than that used by other mud boat drives.

Figure 12:
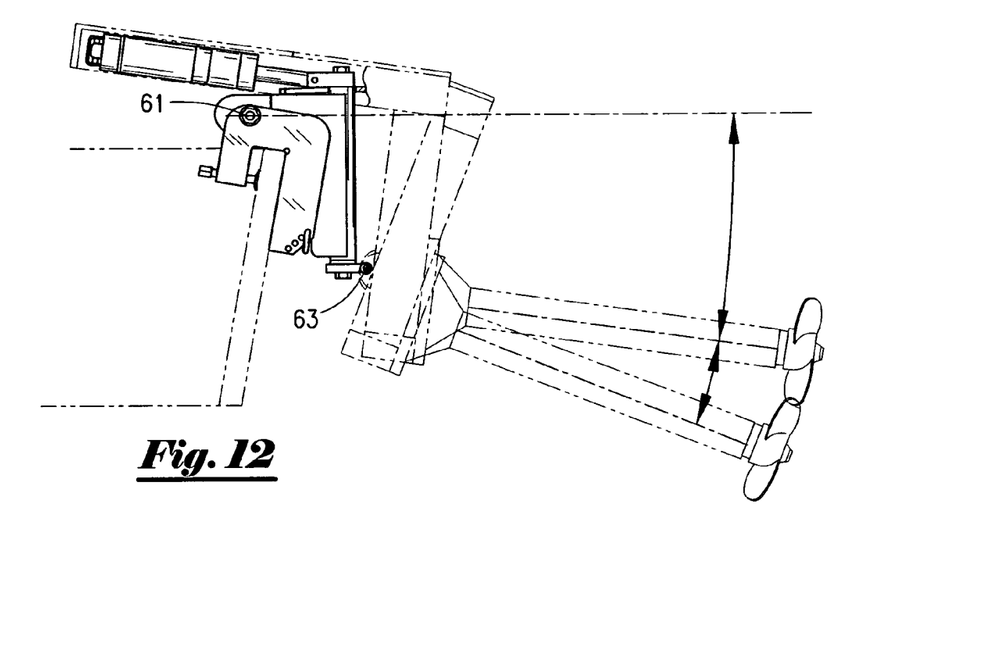
FIG. 12 is side elevation view of the pivoting bracket assembly showing range of motion in the vertical plane.
Figure 13:
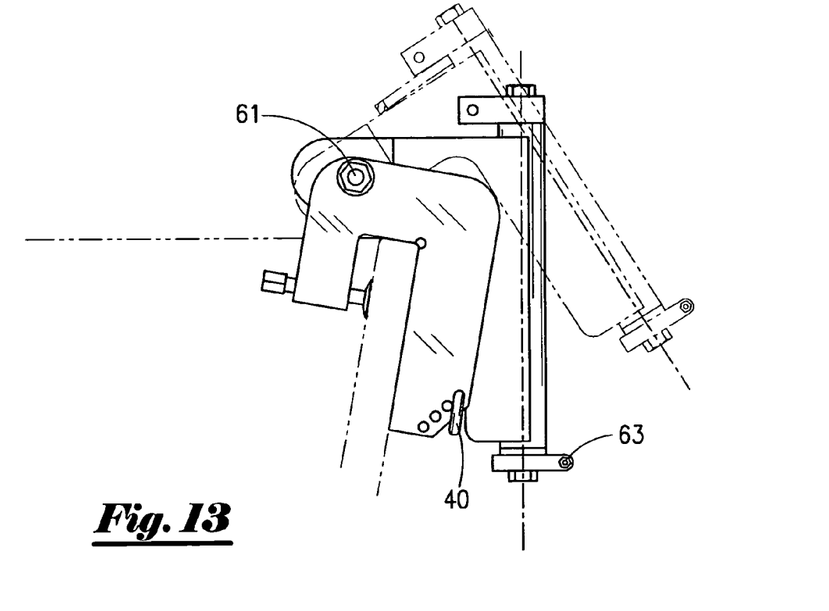
FIG. 13 is side elevation view of the pivoting bracket assembly in the kicked up position in the vertical plane.

It is the dual pivoting points 61 and 63 as again shown in FIGS. 12 and 13 that provides the mounting bracket 14 with dual articulation of the drive 12 and thus allows the propeller 32 to be positioned in both a positive and negative draft angle relative to the boat's hull.

The pivotal handle 56 provides steering and throttle control for the engine assembly 18 and further utilizes a unique locking mechanism 80 that allows the handle to be locked in the down position as shown in FIGS. 1 and 2 and be tilted upwards as shown in FIG. 3.

Figure 14:
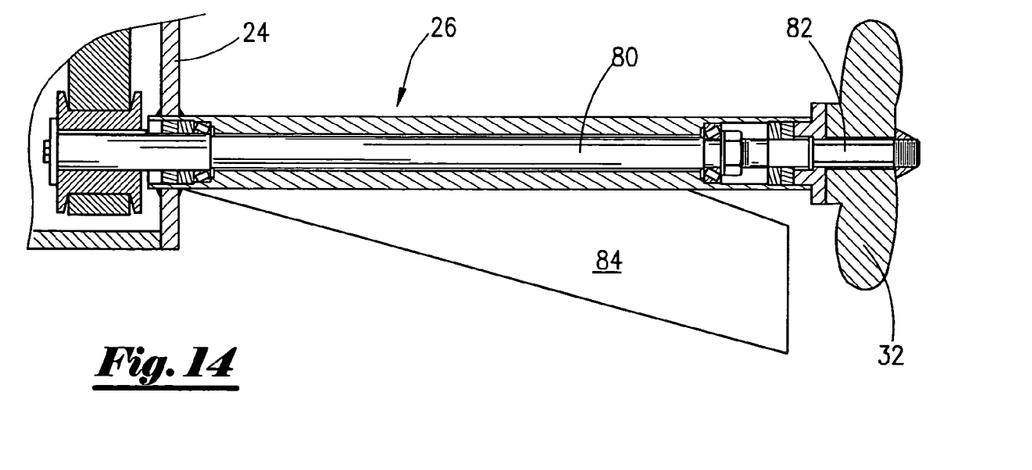
FIG. 14 is a side cross-section view of the drive shaft assembly.
Figures 15, 16:
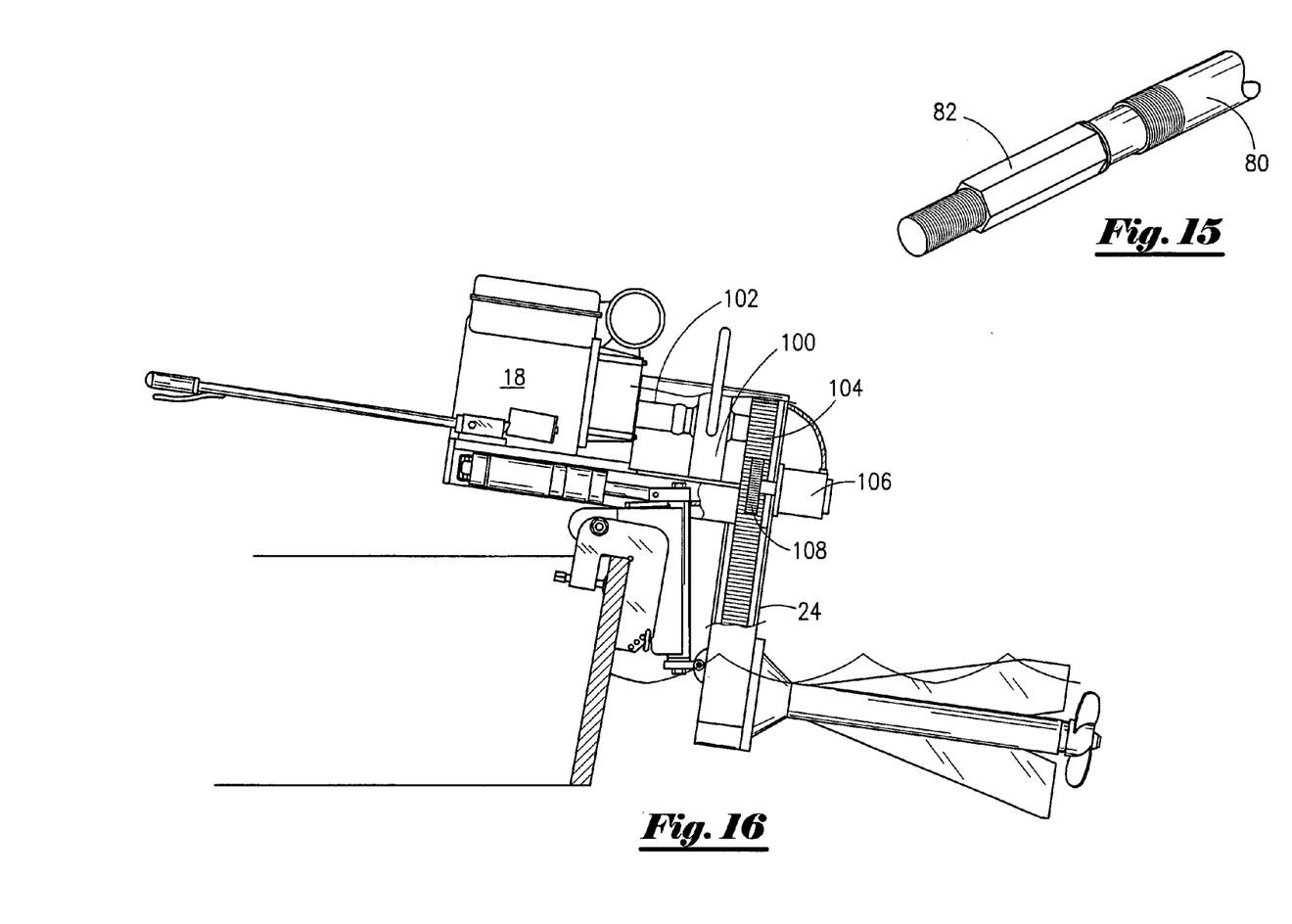
FIG. 15 is a partial isometric view of the drive shaft shown in FIG. 14.
FIG. 16 is side elevation view of the drive assembly showing the reverse drive motor.

Generally, the propeller 32 is secured to the drive shaft assembly 12 as shown and discussed previously. However, in some cases it has been found that allowing the propeller to slip or shear a pin in the conventional manner to prevent damage to the propeller and or damage to the drive shaft is not acceptable when the propeller is required to engage solid materials such as mud and grass. As Illustrated in FIG. 14 and FIG. 15 a more solid connection is recommended. As seen in FIG. 14 the shaft 80 may be modified as shown in FIG. 15 by utilizing a hexagonal shape 82 corresponding to a hexagonal hub located within the propeller 32. This prevents any possibility of shearing as a result of an encounter with immovable objects. However, the lower fin 84 seen in FIG. 14 tends to keep such encounters to a minimum.

Another important aspect of the air-cooled engine outboard drive assembly 12 is shown in FIG. 16. It has been found that in some cases it is advantageous not to use a transmission and simply utilize the high speed of the engine in a 1:1 ratio. However, this precludes the ability to reverse the drive. To still provide reverse capability, a clutch 100 is installed in the driveline between the engine output shaft 102 and the belt drive gear 104. A D.C. voltage drive motor 106 is then mounted externally to the drive belt housing 24 with a gear 108 meshing with the belt drive gear 104. This arrangement allows the belt drive gear 104 to be put into a neutral state when the clutch 100 is in engaged thus allowing the drive motor 106 to turn the belt drive in either direction as needed.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An outboard belt drive assembly having an extended drive shaft assembly comprising:
   a) a frame assembly for mounting a utility engine;
   b) a mounting bracket assembly attached to the frame assembly for temporarily attaching said outboard belt drive assembly to a boat transom said mounting bracket assembly having a pivotal assembly for positioning said belt drive assembly in the horizontal plane; and
   c) a first and second pivoting assembly for positively and negatively positioning said belt drive assembly beyond vertical respectively relative to the mounting bracket assembly-in the vertical plane.

2. The outboard belt drive assembly according to claim 1 wherein said first pivoting assembly is a connection block assembly for allowing said belt drive assembly to rotate in a positive inboard direction in the vertical plane and said second pivoting assembly is a connection block assembly for allowing said belt drive assembly to rotate in a negative outboard direction relative to said transom.

3. The outboard belt drive assembly according to claim 1 wherein the mounting bracket pivoting assembly comprises a pintle assembly.

4. The outboard belt drive assembly according to claim 3 wherein said second pivoting assembly is a clevis assembly pivotally attached to said pintle assembly and said drive assembly.

5. The outboard belt drive assembly according to claim 1 wherein said drive shaft assembly comprises a propeller having an internal hexagonal bore.

6. An outboard belt drive assembly comprising:
   a) a drive housing having an upper end and a lower end;
   b) a drive shaft assembly attached to said drive-housing extending outwardly from said drive housing at said lower end;
   c) a frame assembly attached to said drive housing located adjacent said upper end extending perpendicularly from said drive housing opposite said drive shaft assembly;
   d) a removable transom-mounting bracket having a pintle assembly pivotally attached thereto said pintle assembly having an upper and a lower end;
   e) a pivotal locking assembly for attaching said upper end of said pintle assembly to said frame assembly; and
   f) a block assembly for pivotally attaching said lower end of said pintle assembly to said drive housing opposite said drive shaft assembly.

7. The outboard belt drive assembly according to claim 6 wherein further comprising a utility engine attached to said frame assembly.

8. The outboard belt drive assembly according to claim 7 wherein said engine is controlled and steered by an extended handle attached to said frame assembly.

9. The outboard belt drive assembly according to claim 7 further comprising a clutch assembly for disengaging said drive shaft assembly from said engine.

10. The outboard belt drive assembly according to claim 9 wherein said engine is controlled by an extended handle attached to said frame.

11. The outboard belt drive assembly according to claim 10 wherein said handle is pivotal with positional locking capability.

12. The outboard belt drive assembly according to claim 7 wherein said utility engine is air-cooled.

13. The outboard belt drive assembly according to claim 7 wherein said utility engine comprises an external self contained water-cooled system.

14. The outboard belt drive assembly according to claim 6 further comprising a positioning actuator for pivotally positioning said drive housing and frame assembly relative to said pintle assembly.

15. The outboard belt drive assembly according to claim 6 wherein said drive housing is rotational relative to said pintle assembly.

16. The outboard belt drive assembly according to claim 6 wherein said drive shaft assembly comprises a drive shaft having a hexagonal portion.

17. An outboard belt drive assembly comprising:
   a) a drive housing having an upper end and a lower end;
   b) a drive shaft assembly attached to said drive housing extending perpendicularly from said lower end;
   c) a frame assembly attached to said drive housing located adjacent said upper end extending perpendicularly from said drive housing opposite said drive shaft assembly;
   d) a transom-mounting bracket having a pintle assembly pivotally attached thereto said pintle assembly having an upper and a lower end;
   e) a first connection block rotatably attached to said upper end of said pintle pivotally connected to said frame assembly;
   f) an actuator assembly attached to said first connection block; and
   g) a second connection block rotatably attached to said lower end of said pintle pivotally attached to said drive housing opposite said drive shaft assembly.

18. The outboard belt drive assembly according to claim 17 further comprising a utility engine attached to said frame assembly.

19. The outboard belt drive assembly according to claim 18 wherein said utility engine is air-cooled.

20. The outboard belt drive assembly according to claim 18 wherein said utility engine comprises an external self contained water-cooling system.

21. The outboard belt drive assembly according to claim 18 further comprising a clutch assembly for disengaging said drive shaft assembly from said engine.

22. The outboard belt drive assembly according to claim 21 wherein said clutch assembly is connected to said engine and to a belt drive gear located within said drive housing.

23. The outboard belt drive assembly according to claim 22 wherein said drive gear is connected by a belt to a driven gear attached to said drive shaft assembly.

24. The outboard belt drive assembly according to claim 22 wherein said belt drive gear is driven by a reverse drive gear attached to an electric motor.

25. The outboard belt drive assembly according to claim 21 wherein said actuator is a manually operated lockable lever-locking means.

26. The outboard belt drive assembly according to claim 17 further comprising acutuator for pivotally positioning said drive housing and frame assembly relative to said pintle.

27. The outboard belt drive assembly according to claim 26 wherein said actuator is connected to said first connection block.

28. The outboard belt drive assembly according to claim 26 wherein said actuator is an electric linear actuator.

29. The outboard belt drive assembly according to claim 17 wherein said drive housing is rotational relative to said pintle assembly.

30. The outboard belt drive assembly according to claim 17 wherein said drive shaft assembly comprises a drive shaft having a hexagonal portion.

31. The outboard belt drive assembly according to claim 17 wherein said drive shaft assembly comprises a propeller having an internal hexagonal bore.

32. A method for positioning a transom mounted outboard belt drive assembly relative to said transom comprising the steps of:
   a) attaching a belt driven outboard drive assembly temporarily to the transom of a marine craft comprising;
      I) a drive housing having an upper end and a lower end;
      II) a drive shaft assembly attached to said drive-housing extending perpendicularly from said lower end;
      III) a frame assembly attached to said drive housing located adjacent said upper end extending perpendicularly from said drive housing opposite said drive shaft assembly;
      IV) a transom-mounting bracket having a pintle assembly pivotally attached thereto said pintle assembly having an upper and a lower end;
      V) a pivotal locking assembly for attaching said upper end of said pintle assembly to said frame assembly; and
      VI) a pivotal block for attaching said lower end of said pintle assembly to said drive housing opposite said drive shaft assembly; and
   b) engaging and disengaging a positioning assembly thereby setting a desired pivotal angle for said drive assembly relative to said pintle.

33. The method for positioning a transom mounted belt driven outboard drive assembly according to claim 32 further including the step of manually positioning said drive assembly before engaging and disengaging said positioning means.

34. A method for reversing direction of a transom mounted-outboard belt drive assembly comprising the steps of:
   a) configuring a transom mounted belt driven outboard drive assembly to comprise;
      I) a drive housing having an upper end and a lower end;
      II) a drive shaft assembly attached to said drive-housing extending perpendicularly from said lower end;
      III) a frame assembly attached to said drive housing located adjacent said upper end extending perpendicularly from said drive housing opposite said drive shaft assembly;
      IV) a transom-mounting bracket having a pintle assembly pivotally attached thereto said pintle assembly having an upper and a lower end;
      V) a pivotal locking assembly for attaching said upper end of said pintle assembly to said frame assembly;
      VI) a pivotal block for attaching said lower end of said pintle assembly to said drive housing opposite said drive shaft assembly
      VII) a utility engine attached to said frame assembly;
      VIII) a clutch attached to said engine and connected to a belt drive gear located within said drive housing; and
   b) attaching an electric motor having a second drive gear in mesh contact with said belt drive gear.

35. A method for reversing direction of a transom mounted outboard belt drive assembly according to claim 34 further comprising the step of disengaging said clutch and driving said belt drive gear with said electric motor.

* * * * *